Oct. 4, 1955  S. S. HISCOCK  2,719,687
FISHING ROD HOLDER
Filed July 27, 1951
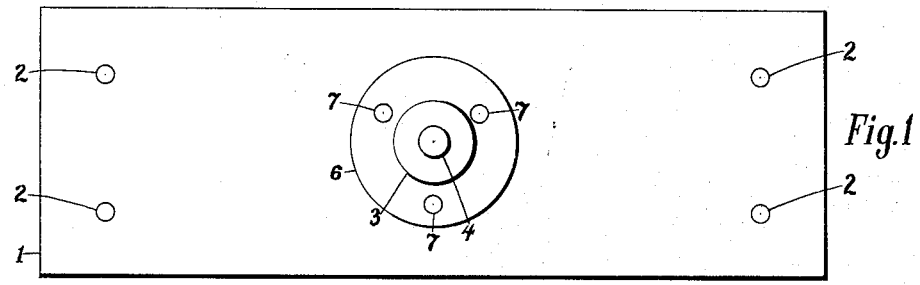
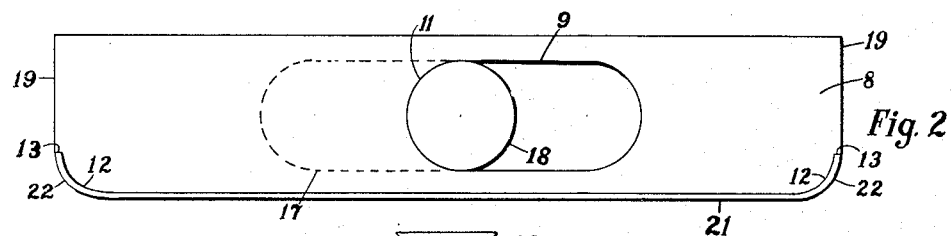
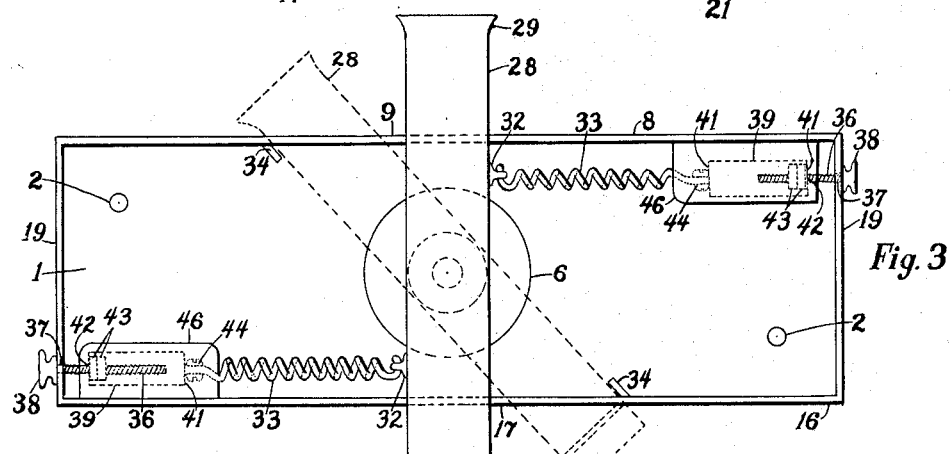
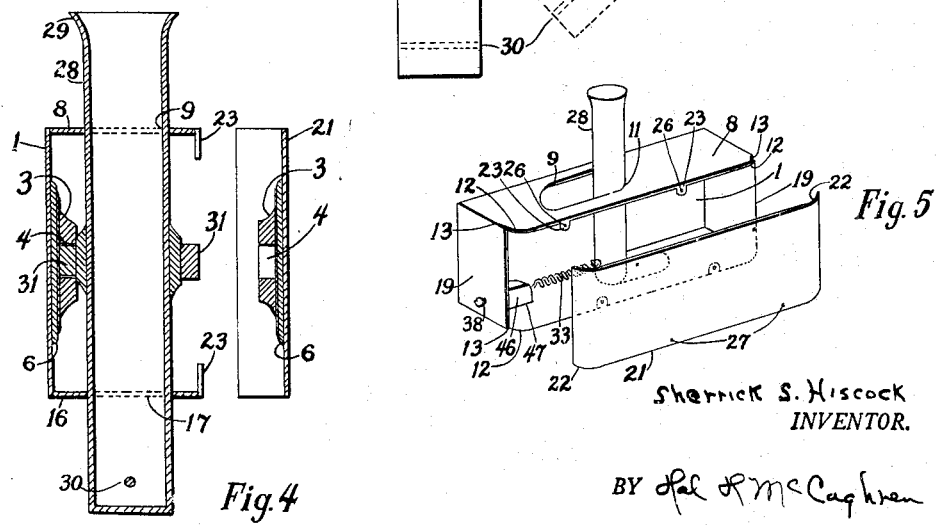
Sherrick S. Hiscock
INVENTOR.
BY Hal H McCaghren
ATTORNEY

United States Patent Office 2,719,687
Patented Oct. 4, 1955

2,719,687

FISHING ROD HOLDER

Sherrick S. Hiscock, West Palm Beach, Fla.

Application July 27, 1951, Serial No. 238,892

4 Claims. (Cl. 248—40)

This invention relates to improvements in fishing rod holders and is particularly directed to pivotally mounted holders secured to a boat and having resilient means permitting the holder to rotate under stress of the resilient means when subjected to undue or impact stresses.

An object of this invention is to provide a fishing rod holder that normally maintains the fishing rod in vertical position, and at the same time yields under tension in response to stresses on the line, such as impact stress occurring when a strike is made, to prevent parting of the line.

Another object of this invention is to provide a safety strike feature in fishing rod holders of the class described having adjustable tensioning means.

A further object of this invention is to provide a fishing rod holder pivotally mounted in a boat and having resilient means on opposed sides of the pivot normally retaining the holder in vertical position and permitting the holder to rotate under sudden or excessive stresses, and returning the holder to vertical position when the stresses are removed.

A still further object of the invention is to provide a receptacle for a fishing rod which is normally held in vertical position by opposed resilient means under tension, and at the same time being longitudinally pivotal against the tension of the resilient means to a predetermined position.

Further objects and advantages of this invention, including ease and economy of construction and durability in use, will be more and fully understood from reading the following specification in conjunction with the drawing, forming a part thereof, wherein:

Fig. 1 is a side elevation of the mounting plate of the invention having a pivot support mounted thereon;

Fig. 2 is a plan view of the device of this invention for port side of a boat, parts being removed for clarity;

Fig. 3 is a side isometric view of the device of this invention for starboard side of a boat, side plate and other parts removed for clarity;

Fig. 4 is a cross-sectional view in partial disassembly of the pivot arrangement of the device of this invention taken through the longitudinal axis of the rod holder; and, Fig. 5 is a perspective view of the device of this invention for starboard side of a boat, in partial disassembly, parts removed for clarity.

Referring to the drawings, wherein like members are given the same reference numeral, a rectangular mounting plate 1 is provided with a plurality of apertures 2, usually four positioned near the corners thereof, to receive screws or bolts to secure the plate 1 to the gunwale of a boat or other suitbale bracket or support properly secured to the boat. Any suitable material may be for this plate, such as aluminum, and marine brass, but the preferred material is stainless steel. Secured to the wall face of the mounting plate 1, and preferably centered thereon, is a pivot support 3. This pivot support 3 is secured to the plate 1 in any suitable manner, such as spot welding, but the preferred method of securing is by bolting. The pivot support 3 has a centrally positioned cylindrical recess 4, and a flanged end 6, which is provided with apertures 7 aligning with like apertures in the mounting plate 1 to receive bolts for securing the members together.

A top member 8, of any suitable material, but preferably stamped integral with the mounting plate 1, is provided with an oblong aperture 9. This aperture 9 is positioned with the arc radius of one end 11 centered and the extension being along the longitudinal axis of the top member 8. One edge of the top member 8 has the corners thereof 12 arcuate and recessed to provide shoulders 13. The top member 8 is preferably perpendicular to the mounting plate 1 and rigidly supported thereby, either by being formed integral therewith or being welded thereto.

A bottom member 16, of any suitable material, but preferably stamped integral with the mounting plate 1, is positioned parallel to the top member 8. This bottom member 16 is identical in size and shape as the top member 8, with the exception that the oblong aperture 17 in the bottom member extends in the opposite direction from the aperture 9 in the top member 8. The arc of one end 18 of the aperture 17 is positioned with the radius centered, thus in plan view the arc of the aperture 17 overlaps the arc of aperture 9, defining a circle, Fig. 2. The corners 12 of one edge are also arcuate and provided with shoulders 13.

End members 19 are provided of any suitable material, preferably by stamping integral with the mounting plate 1, although they may be formed separately and secured to the mounting plate 1 in any suitable manner such as spot welding. These end members 19 extend perpendicular from the mounting plate 1 to the shoulders 13 provided in the top and bottom members 8 and 16.

To complete the box or housing, there is provided a side plate 21, of any suitable material such as aluminum or brass, but preferably of stainless steel. This side plate 21 has arcuate ends 22 of the same radius as the arcuate corners of the top and bottom members and the face edge of the arcuate ends 22 abut the shoulders 13, as well as the edge of the end members 19 contiguous thereto. Centrally positioned and secured to the side plate is a pivot support 3 identical with the one previously described as attached to the mounting plate 1. The side member of plate 21 may be secured to the top member 8 and bottom member 16 in any suitable manner such as welding. Since it is a desirable feature to have the side member or plate 21, easily and simply removable for access to the interior of the housing thus formed, simple threadedly engaging means are provided for fastening the members together.

The threadedly engaging fastening means for securing the side plate 21 to the other members comprises ears 23 projecting perpendicular to the plane of the top member 8 and bottom member 16 to which they are secured, preferably by casting or stamping integral therewith. These ears 23 are provided with internally threaded eyes or apertures 26, which may be further reinforced with nuts spot welded therebehind, and in co-axial alignment therewith. Apertures 27 are provided in the side plate 21 in co-axial alignment with the internally threaded eyes or apertures 26. Bolts are then extended through the apertures 27 and threadedly engage the threaded eyes or apertures 26, and nuts if so provided, to tightly secure the side plate 21 to the top member 8 and bottom member 16.

A hollow cylindrical fishing rod holder adapted to receive a fishing rod is positioned in the overlapping oblong apertures 9 and 17 and is provided with a flared end 29 and pin 30 on which the end of the fishing rod rests. Positioned on diametrical opposed sides of the holder 28, and preferably at approximately the longitudinal center of the holder 28, are cylindrical pivot projections 31 cooperating with the pivot supports 3 by insertion in the cylindrical recess 4 to provide pivotal relationship therebetween. These projections 31 are preferably cast integral with the holder 28. On opposed sides of the holder 28, and a quadrant removed from the pivot projections 31, and on opposite sides with respect thereto, are eyes 32.

A coil spring 33 has one end connected to the end member 19, and the other end hooked through the eye 32 under tension. There are two of these springs 33, one above the pivot and one below the pivot, arranged in opposed tensional stress, maintaining the holder 28 in vertical position abutting the arcuate end 11 of the aperture 9 and the arcuate end 18 of the bottom member aperture 17, but permitting rotation against the tension of the springs 33 through the angle permitted by the length of the oblong apertures 9 and 17, as illustrated in the isometric view of Fig. 3. Stops 34 are provided on the top member 8 and bottom member 16, at an angle equal to the maximum angle of rotation permitted by the apertures 9 and 17, to reinforce the stop means afforded by the ends of the apertures.

Adjusting means are provided to adjust the tension on the springs 33. The means comprise a bolt 36 extending through an aperture 37 provided in the end member 19 and having a knurled head 38 projecting on the outside of the end 19 against which it abuts. The bolt 36 threadedly engages a nut or nuts 43. The preferred connection and fastening means between the spring 33 and bolt 36 is an adjusting slide 39, substantially U-shaped in cross-section. Ends 41 are provided to complete a trough shaped adjusting slide 39. An aperture 42 is provided in the end 41 which is adjacent the end member 19, through which the bolt 36 extends and engages by threaded engagement a nut or pair of nuts 43, not in lock relationship, abutting the inner face of the end 41. The nuts 43 are approximately the same size in cross-section as the adjusting slide 39, whereby the nuts do not turn when the knurled head 38 is turned. The spring 33 may be secured to the adjusting slide 39 in any suitable and convenient manner, such as welding, brazing and soldering; the preferred method of securing these members, however, is to provide an eye or saddle bracket 44 on the end 41 which is closest to the spring. The spring 33 is then hooked into the eye or bracket 44 under tension. Another convenient method of securing the spring 33 to the adjusting slide 39 is to provide apertures in the end 41 into which the spring may be hooked.

A slide guide 46 in the form of an elongated saddle bracket having a substantially U-shaped cross-section and open ends is provided around the slide 39 to prevent it from turning, twisting or bouncing in use. The legs 47 of the guide 46 are welded to the top or bottom member as the case may be.

In construction, the device may be fabricated from individual member pieces; it is preferred, however, to do a plat layout of the mounting plate 1, top member 8, bottom member 16, and end members 19, and stamp these members integral from a single sheet of material. The apertures 2, 9, 17, 42 and other apertures where employed such as for fastening the pivot supports, and the ears 24, are stamped in the same operation. These parts are then bent to position. The pivot supports 3 are secured to the plates 1 and 21, the rod holder is positioned through the apertures 9 and 17 and has a pivot projection 31 inserted in the pivot support 3 on the mounting plate 1. The slide guide 46, slide 39, bolt 36 and nuts 43 are then placed in position and secured and the coil spring inserted and fastened. The side plate 21 is then secured to the top and bottom members by bolts threadedly engaging the eyes 26 in the ears 23 and nuts therebehind if provided.

The plat layout is the same for both port and starboard devices. To provide devices for one side, the top member 8 and bottom member 16 are bent in one direction with respect to the mounting plate 1; whereas, to provide devices for the other side, the top and bottom members 8 and 16 are bent in the other direction with respect to the mounting plate 1, as illustrated in comparison of Figs. 2, 3 and 5.

The operation of the device as described for troll fishing is simple. The rod is inserted in the holder 28; when a strike is made, the holder is rotated rearwardly against the tension of the springs 33, thus taking the impact stress off the line and rod. As soon as the impact stress is dissipated, the holder 28 returns to normal position of vertical by the action of the springs 33; but, is free to rotate if additional stress is exerted. The tension on the springs 33 may be adjusted in either direction by turning the knurled head 38 which turns the bolt 36 threadedly engaging the nut or nuts 43 to move the adjusting slide 39 against which the nut 43 abuts. The slotted end of fishing rod receives pin 30 preventing twist.

As seen by the above description and drawings the device comprises a rectangular housing, including spaced plates to which is pivotally mounted the hollow cylindrical rod holder, and opposed resilient means on opposite sides of the pivot. Many modifications may be made, such as providing saddle bracket pivot support or stud projection support for the pivot from the top member, bottom member or ends, without departing from the spirit and scope of the invention as defined in the appended claims.

Having thus described the invention, what is claimed and desired to secure by grant of United States Letters Patent is:

1. A fishing rod holder for mounting on boats comprising a vertically disposed mounting plate, a top member secured perpendicular to said mounting plate, a bottom member secured perpendicular to said mounting plate and parallel to said top member, oblong apertures provided in said top member and said bottom member, said apertures being so constructed and arranged that opposed arcuate ends thereof overlap defining a circle in plan view, a side plate, means pivotally supporting a hollow cylindrical holder between said plates, resilient means normally urging said holder to a vertical position and said holder abutting said overlapped ends of said apertures, and means securing said side plate in rigid spaced relationship with said mounting plate.

2. A fishing rod holder for mounting on boats comprising a cylindrical holder, spaced parallel plates, means pivotally supporting said holder between and parallel to said plates, resilient means connected to said holder on opposite sides of said pivot means and stressed in opposed directions, stop means preventing rotation of said holder beyond predetermined limits in either direction, and means for adjusting the stress on said resilient means, said stop means comprising top and bottom members, oblong apertures provided in said members, and said apertures being so constructed and arranged that opposed arcuate ends thereof overlap, defining a circle in plan view.

3. A fishing rod holder for mounting on boats comprising a hollow holder, spaced parallel plates, means pivotally mounting said holder between and parallel to said plates, coil springs connected to said holder on opposed sides of said pivot means and stressed in opposed directions, stop means preventing rotation of said holder beyond predetermined limits in either direction, and threaded engaging means connected with said springs for adjusting the tension thereon, said stop means comprising top and bottom members, oblong apertures provided in said members, and said apertures being so constructed and arranged that opposed arcuate ends thereof overlap, defining a circle in plan view.

4. A fishing rod holder for mounting on boats comprising a vertically disposed mounting plate, a top member, a bottom member, said members being secured perpendicular to said mounting plate and parallel to each other, end members secured to said mounting plate, a side plate, means removably fastening said side plate to said top and bottom members and extending in opposite directions, hollow pivot supports secured to said mounting plate and side plate, oblong apertures provided in said top and bottom members, said apertures being so constructed and arranged to have overlapping arcuate ends defining a circle in plan view, a hollow cylindrical rod holder extending through said apertures, pivot projections on said holder received by said hollow pivot supports, coil springs fastened to said holder, and threaded engaging means fastening said springs to adjacent end members.

References Cited in the file of this patent

UNITED STATES PATENTS

| | | |
|---|---|---|
| 909,247 | Spry | Jan. 12, 1909 |
| 999,989 | Hancher | Aug. 8, 1911 |
| 1,078,006 | Skeen | Nov. 11, 1913 |
| 1,647,045 | Humphris | Oct. 25, 1927 |
| 2,179,357 | Stava | Nov. 7, 1939 |
| 2,312,957 | Cannon | Mar. 2, 1943 |
| 2,427,600 | Hanke | Sept. 16, 1947 |
| 2,461,356 | Sus | Feb. 8, 1949 |
| 2,548,328 | Thayer | Apr. 10, 1951 |

FOREIGN PATENTS

| | | |
|---|---|---|
| 254,203 | Germany | of 1912 |